Dec. 12, 1939.   J. M. GOLDBERG   2,182,944
FILM REWIND DEVICE
Filed Nov. 7, 1938   3 Sheets-Sheet 1
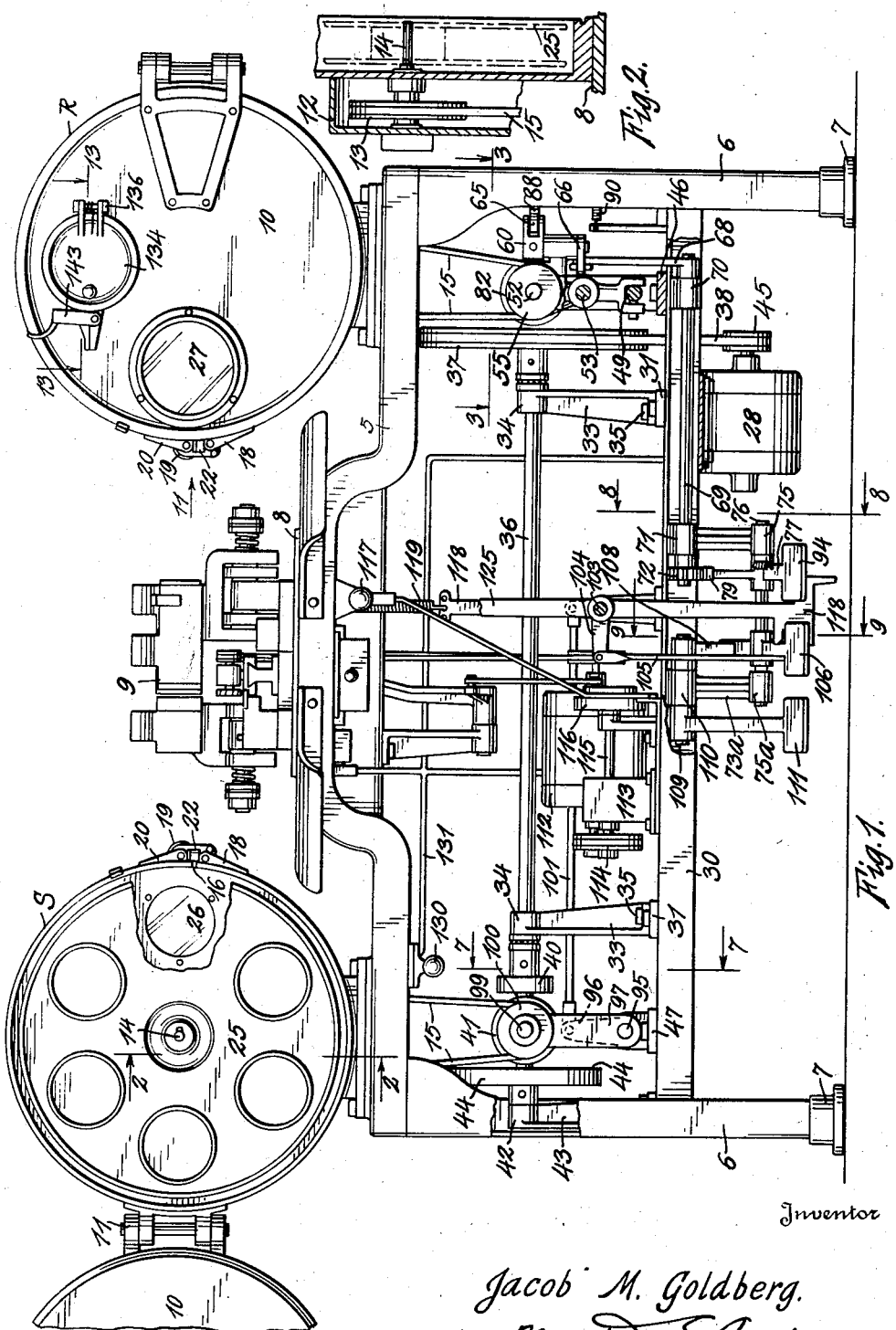
Inventor
Jacob M. Goldberg.
By Martin E. Anderson
Attorney Dec. 12, 1939.　　　J. M. GOLDBERG　　　2,182,944
FILM REWIND DEVICE
Filed Nov. 7, 1938　　　3 Sheets-Sheet 2

Inventor
Jacob M. Goldberg.
By Martin E. Anderson
Attorney

Dec. 12, 1939.   J. M. GOLDBERG   2,182,944
FILM REWIND DEVICE
Filed Nov. 7, 1938   3 Sheets-Sheet 3
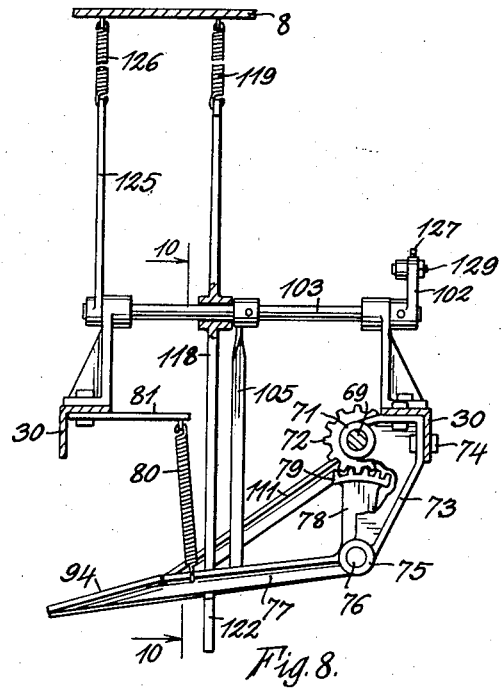
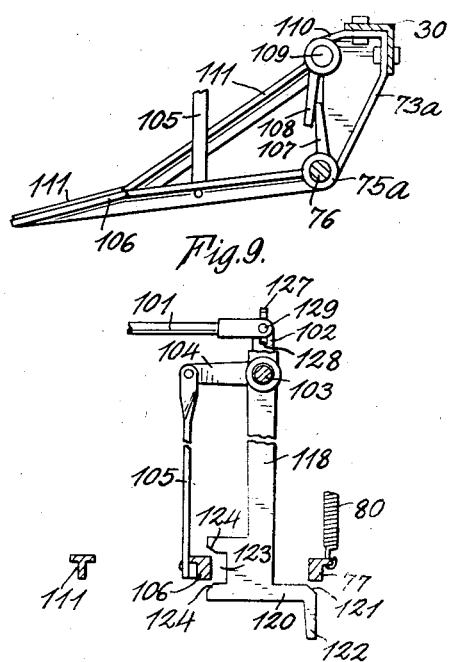
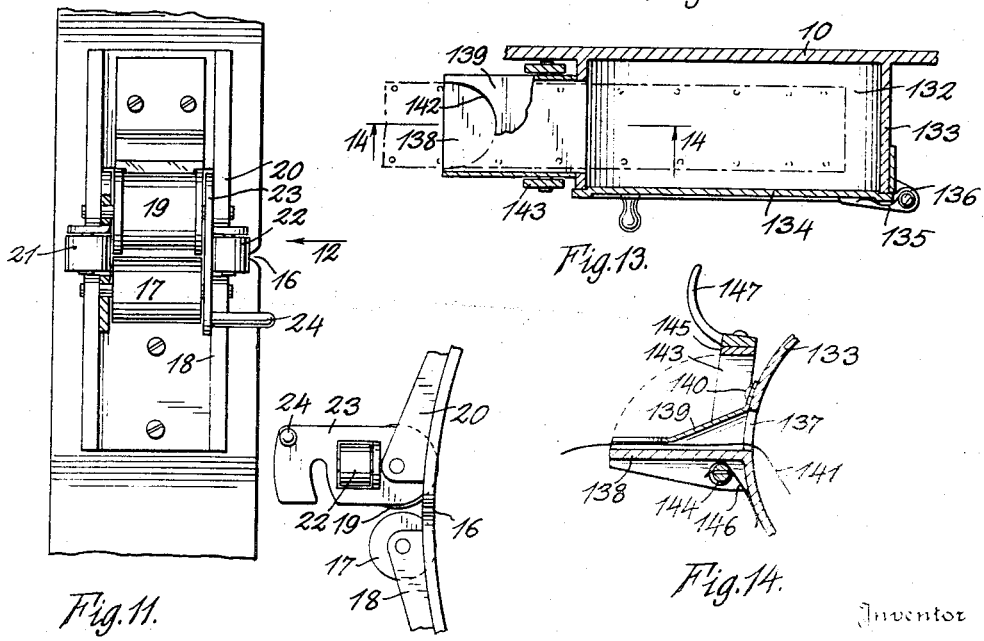
Inventor
Jacob M. Goldberg.
By Martin E. Anderson
Attorney Patented Dec. 12, 1939

2,182,944

UNITED STATES PATENT OFFICE 2,182,944

FILM REWIND DEVICE

Jacob M. Goldberg, Denver, Colo.

Application November 7, 1938, Serial No. 239,212

8 Claims. (Cl. 242—55)

This invention relates to improvements in film rewind machines.

In the manufacture and use of moving picture films, it is necessary to wind the film on reels and to transfer it from one reel to another. After each exhibition of a picture, the film must be rewound in order to bring the front end to the outside of the reel. During the rewinding operation, after each exhibition, the film must also be inspected for tears or breaks and these repaired.

In my copending application, Serial No. 229,499, filed September 12, 1938, I have described a machine for use in rewinding and repairing moving picture films and in which the claims are limited to the splicing device. This application is a continuation in part of the above identified application and relates to the rewind mechanism.

In many places much moving picture film is handled every day and it is therefore quite essential that power operated machines of large capacity shall be employed that will enable each operator to handle a maximum amount of film with the least amount of exertion or effort.

It is the object of this invention to produce a power driven film winding machine, controlled by foot operated pedal in such a way that the operator's hands will be free to check the film for breaks and tears as it runs between his fingers.

Another object is to produce a machine in which the speed of the winding is controlled by the pedals in such a way that the speed is increased by the downward movement of the pedal and in which the reel is stopped or disconnected from the driving mechanism by the first upward movement of the control pedal and in which the speed can be reduced by a further upward movement of the pedal.

A further object is to produce a machine in which both the rewind and the supply reel can be rotated by power and in which the latter can be rotated in opposite directions and at different speeds.

A still further object is to produce a machine provided with an interlock which makes it impossible to simultaneously apply power to both reels.

The above and other objects that may become apparent as this description proceeds are attained by means of a combination and an arrangement of parts that will now be described in detail, and reference for this purpose will be had to the accompanying drawings in which the invention has been illustrated in its preferred form and in which:

Figure 1 is a front elevation of the machine, portions being broken away to better disclose the construction;

Figure 2 is a section taken on line 2—2, Fig. 1;

Figure 8 is a view taken on plane 8—8, Fig. 1;

Figure 9 is a view taken on plane 9—9, Fig. 1;

Figure 10 is a view taken on plane 10—10, Fig. 8;

Figure 11 is a fragmentary elevation, looking in the direction of arrow 11, in Fig. 1, and showing a portion of the rewind reel casing;

Figure 12 is a view, looking in the direction of arrow 12, in Fig. 11;

Figure 13 is a section taken on line 13—13, Fig. 1; and

Figure 14 is a section taken on line 14—14, Fig. 13.

Figure 3:
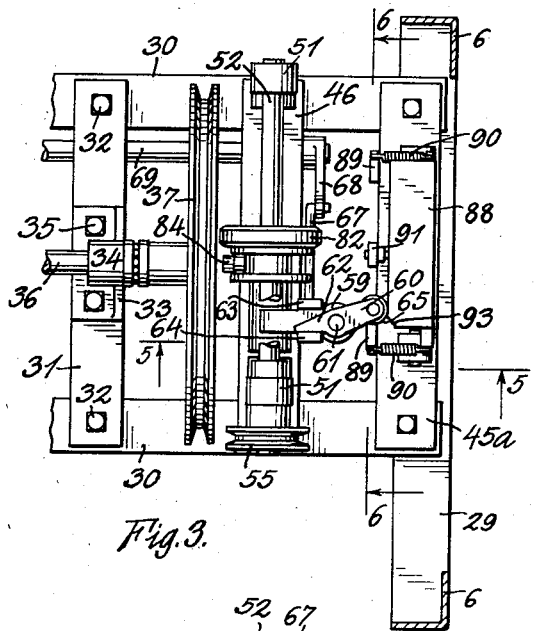
Figure 3 is a view, partly in section, taken on line 3—3, Fig. 1.

In the drawings reference numeral 5 designates the top of a table which is preferably cast from metal, as for example, aluminum. This table rests on four legs or supports 6, which are preferably removably secured to the table top by suitable means which have not been shown. The bottom of the legs are provided with removable feet 7 to keep the legs from scratching and to improve the appearance. The table has an elevated section 8 substantially midway between its ends; in this elevated section is positioned a splicing mechanism 9, which is described and claimed in my copending application above identified.

Supported on the upper surface of the table and near the ends thereof, are two reel housings; the one positioned on the right end of the table in Fig. 1 has been designated by letter "R" and will, for the purpose of this description, be referred to as the rewind reel housing. The housing positioned at the lefthand end of the table has been designated by letter "S" and will be referred to as the supply reel housing. The designations above given are for convenience only, as the reel located in housing S is also used for rewinding films when occasion requires. The housings are each provided with a door 10, which is connected with the housing proper by means of a hinge 11. The housing is preferably cast from aluminum, or any other suitable metal, or may be made in any other suitable way, and is provided on its rear surface with a separable housing 12 that forms a shield or enclosure for a belt pulley 13 that is secured to the shaft 14 on which the reel is fastened during operation. A V-shaped belt 15 extends downwardly through an opening in the table top and connects each of the drive shafts 14 with a suitable power transmission mechanism that will be described hereinafter. The housings have their circular walls provided with notches or openings 16 that face each other, and positioned below these openings are rollers 17 that are mounted for free rotation in bearing 18. Positioned above the opening 16 are flanged rollers 19 that are mounted for rotation in bearing blocks 20. Vertically positioned rollers 21 and 22 are positioned adjacent the ends of rollers 19 and 17 for the purpose of serving as guides for the edges of the film. In order to facilitate the introduction of the film, roller 22 has been shown as mounted on a hinged member 23 that can be swung upwardly into the position shown in Fig. 12, so that a film may be moved edgewise inwardly into the slot 16. After the film has been introduced, member 23 is moved downwardly into operative position and for the purpose of facilitating the moving of member 23, the latter is provided with a handle 24. In each housing is a reel 25 which is carried by the drive shaft 14 shown in Fig. 2. The back walls of the reel housings are provided with openings covered by glass or other transparent material 26, and the doors are provided with similar openings having transparent closures 27. When the doors are closed, the window or transparent members 26 and 27 are opposite each other so that the operator can have a clear vision of the reel positioned within the housing.

For the purpose of providing power for rotating the reels, an electric motor 28 has been provided and positioned as shown in Fig. 1. It will be seen from the drawings that the legs 6, at each end of the table, are connected by means of bars 29, which may be cast integral with the legs, if desired. Extending longitudinally of the table and supported by the bars 29, are two bars 30 which are preferably parallel to each other and have an angle form as shown in Fig. 7. The bars 30 serve to support the motor 28 and the other mechanism which will now be described. Adjacent each end of bars 30, transverse bars 31 are positioned and secured in place by means of bolts 32 as shown most clearly in Fig. 3. Extending upwardly from each bar 31 is a bracket 33 provided at its upper end with a bearing 34. These brackets are secured to bars 31 by bolts 35 or other suitable means. A shaft 36 is journalled in the bearings 34 and this shaft is provided at the righthand end in Fig. 1 with a belt pulley 37, whose periphery is grooved for the reception of a V-shaped belt 38. The righthand side of this pulley is flat and serves as a disk for cooperating with a friction gear pinion. Secured to the shaft 36 adjacent the bearings 34 at the left of the center is a small friction disk 40 that cooperates with a friction pinion 41. The left end of shaft 36 is journalled in a bearing 42 at the upper end of the bracket 43. Friction disk 44 is attached to shaft 36 adjacent the bearing 42 and so positioned that it can be engaged by the friction pinion 41. Belt 38 is cooperatively engaged with the grooved pulley 45 on the motor shaft so that when the motor operates, shaft 36 will be rotated. Attached to the upper flanges of bars 30 between the brackets 33 and the ends of the bars, are transverse bars 46 and 47. Bar 46 is provided with spaced upwardly extending lugs, or bearing blocks 48 in which is journalled a shaft 49. Attached to the outer ends of shaft 49 are arms 50 that are provided at their upper ends with bearing blocks 51 in which is journalled shaft 52. A rod 53 is positioned between the shafts 49 and 52 and extends through holes in the arms 50 and are secured to the latter by means of pins 54. A belt pulley 55 is attached to the outer end of shaft 52 in the manner shown in Fig. 6. Slidably mounted on the rod or shaft 53 is a crosshead 56, whose lower end is provided with two spaced fingers 57 which form a fork that straddles the rod or shaft 49 in the manner shown in Fig. 5. A screw 58 serves to adjust the parts in such a way that there will be no appreciable lost motion between the fingers 57 and the rod 49. The crosshead, as above stated, is free to move on rod 53 and has a laterally extending bracket 59 to the end of which a pawl-like member 60 is attached by means of a pivot 61. The pawl is provided with a tapered projecting portion 62 that is positioned between the two stops 63 and 64. The outer end of pawl 60 is provided with a roller 65. The pivot 61 is nonrotatably connected with the pawl 60 and extends through a bearing in the vertical tubular portion of the bracket 59. Nonrotatably secured to the lower end of the pivot pin 61 is a short crank arm 66 to the outer end of which a connecting rod 67 is pivotally attached. The other end of the connecting rod is pivotally connected to the upper end of a crank arm 68, which in turn is nonrotatably connected with a shaft 69 that is journalled in a bearing 70 secured to the under surface of the transverse bar 46. The other end of shaft 69 is journalled in a bearing 71 and is provided with a gear 72. The bearing 71 is formed in a casting 73 that is secured to the flanges of the bar 30 by means of bolts 74 in the manner shown in Fig. 8. The casting 73 extends downwardly and is provided at its lower end with a bearing 75 in which is journalled one end of a shaft 76. The other end of this shaft is journalled in a similar bearing 75a at the lower end of a bracket 73a of substantially the same size and shape as brackets 73. Pivotally connected with the shaft 76 is a pedal 77 that is of substantially bell crank shape and has an upwardly extending portion 78 provided at its upper end with a gear segment 79 that engages the gear 72 in the manner shown in Fig. 8. A spring 80 has its lower end connected with the pedal 77 and its upper end connected with a bracket 81 secured to one of the frame members 30. Spring 80 is a tension spring and tends to hold pedal 77 in the position shown in Fig. 8 until it is acted upon by a force that tends to move the front end thereof downwardly. When pedal 77 is in the position shown, the crank arm 68 is in the position shown in Fig. 6, which will be considered the normal inoperative position of the parts just described. Slidably, but nonrotatably attached to the shaft 52, is a friction pinion 82 whose hub is provided with an annular groove 83. Formed integral with the crosshead 56 is an upwardly extending lug or projection 84 that engages in the groove 83 for the purpose of moving the pinion longitudinally on shaft 52 when the crank arm 68 is rotated through the operation of pedal 77.

Spring 80 tends to move the parts to the position shown in Fig. 6 until acted upon by some force in a manner which will hereinafter be more fully described.

Figure 5:
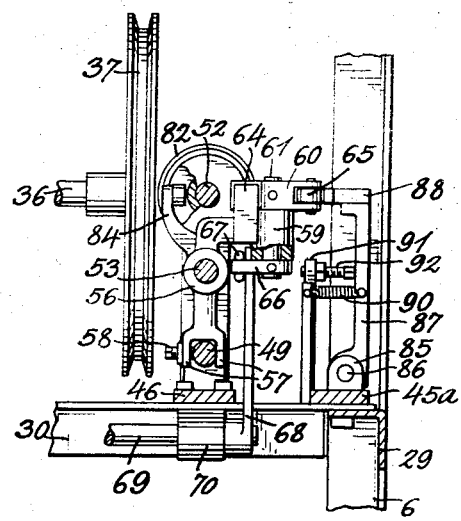
Figure 5 is a view, partly in section, taken on line 5—5, Fig. 3.
Figure 4:
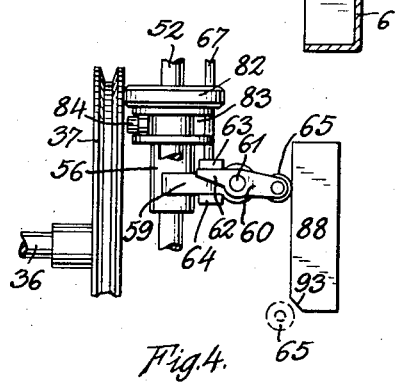
Figure 4 is a fragmentary view, similar to that shown in Fig. 3, and shows the friction gear in operative position.

Referring now more particularly to Figs. 3, 4 and 5 it will be seen that a bar 45a is secured to the tops of longitudinal bars 30 and is provided with lugs 85 that have openings forming bearings for a pivot pin 86. Extending upwardly from the pivot 86 are two arms 87 to the upper ends of which a plate 88 is attached. Vertically extending brackets 89 are positioned a short distance inwardly from arms 87 and are connected to these by means of tension springs 90. A bracket 91 extends upwardly and is provided with an adjustable screw 92 that serves as a stop which limits the inward movement of the arms 87 and the plate 88. It will be noted that the lower inward corner, Fig. 3, of plate 88 has a portion cut off so as to form an inclined surface 93. When the parts are in normal or inoperative position, the roller 65 is positioned below the inclined surface 93, which position will be reached after the parts have moved downwardly a short distance from the position shown in Fig. 3. If we now assume that roller 65 is down below the inclined surface 93 in the position shown in dotted lines in Fig. 4 and that pressure is applied to the foot plate 94 of pedal 77 which turns the shaft 69 in a clockwise direction when viewed as in Fig. 6, the arm 68 will begin to move clockwise and this in turn will move the crosshead 56 towards the right in Fig. 6. The first effect of this will be to turn the pawl 60 into the position shown in Fig. 4 which will exert a toggle action that forces the pinion 82 against the friction surface of pulley 37.

A further movement will move the roller up onto the straight edge of plate 88. When the pinion 82 is first moved into frictional contact with pulley 37, it will contact with the latter substantially at its central point with the result that pinion 82 will not be rotated. As pedal 77 is moved downwardly, crosshead 56 will be moved a corresponding distance towards the right in Fig. 6 and this will move the pinion 82 away from the center, whereupon it will start rotating and rotate shaft 52 to which it is connected and this, in turn, will rotate the drive shaft for the reel in reel housing R. It will be observed, that the farther pedal 77 is moved downwardly, the farther pinion 82 will be from the center of the rotating disk, and the greater will be the speed at which shaft 52 rotates. The speed of the reel in housing R can therefore be controlled by the position of the pedal 77 in a manner somewhat analogous to the speed of an automobile when the position of the accelerator is moved downwardly. If for any reason the reel is to be stopped, the operator merely releases the pressure on the foot plate 94 and permits the pedal to move upwardly a slight distance in response to the action of spring 80. This upward movement is communicated to the crosshead 56 through the crank arm 68 and the connecting rod 67, thereby moving the parts toward the left in Fig. 6, or downwardly in Fig. 4. The first result of this is to move the pawl 60 from the position shown in Fig. 4 to that shown in Fig. 3 which allows the pinion 82 to move away from the friction disk 37 and in this way the power for rotating the reel housing R will be disconnected. When the reel is to be again started, the operator merely exerts more pressure on the foot plate 94 thereupon moving the crosshead so as to move the pawl from the position shown in Fig. 3 to that shown in Fig. 4, whereupon the pinion 82 will again engage the disk at substantially the same place where it was when it was disconnected. By allowing the pedal 77 to move upwardly a greater distance and the crosshead to move towards the left, a greater distance, the speed at which the reel is again started can be made less than that at which it was rotating when stopped. By adjusting the screw 92, which in turn adjusts the position of plate 88, the parts can be readily adjusted to get the action above described.

It has already been pointed out that the left-hand end of shaft 36, in Fig. 1 is provided with two spaced friction disks 40 and 44 between which is positioned a pinion 41.

Figure 6:
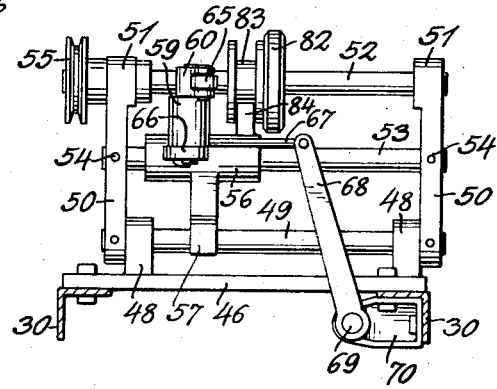
Figure 6 is a view taken on vertical plane 6—6, Fig. 3.
Figure 7:
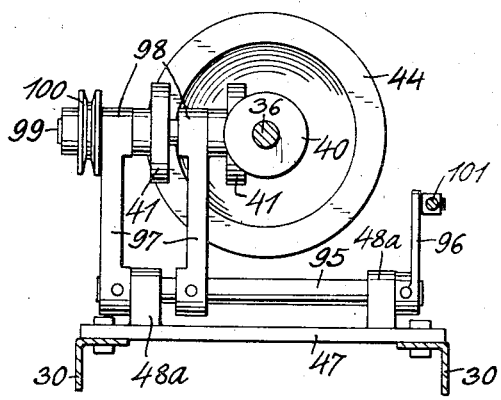
Figure 7 is a view taken on plane 7—7, Fig. 1.

Referring now more particularly to Fig. 7, it will be seen that the transverse bar 47 corresponds almost exactly in appearance to the corresponding bar 45 shown in Fig. 6 and is provided with upwardly extending lugs 48a in which is journalled a shaft 95 that can be rotated through a small arc. Secured to one end of this shaft is a crank arm 96, shown dotted in Fig. 1, and to the other end is connected a bracket 97. A similar bracket which has also been numbered 97 is connected with the shaft between the lugs 48a in the manner shown in Fig. 7. The upper ends of the brackets 97 are provided with bearings 98 in which is journaled a shaft 99. The inner end of this shaft carries a pinion 41 that is positioned so that it can engage the adjacent surface of friction disk 40. Between the bearings 98 is another pinion 41 which is so positioned that it can engage the friction surface of disk 44. The pulley 100 is connected with the drive shaft 14 in reel housing S by means of a belt 15. Since both friction disks 40 and 44 are nonrotatably connected with shaft 36, they must, of course, turn at the same speed and whenever the parts are so adjusted that the pinion 41 that corresponds to the friction disk 40 engages the friction surface of this disk, shaft 99 will be rotated at a slow speed in one direction. Whereas, if the parts are moved so that the friction pinion 41 that corresponds to the disk 44 comes into operative engagement with the friction surface of disk 44, shaft 99 will be rotated at a higher speed in the opposite direction.

The position of pinions 41 are controlled by a mechanism which will now be described and which comprises a connecting rod 101 that is pivotally connected at one end with the upwardly extending arm 102 of a bell crank lever pivoted for movement about the center of shaft 103 and whose horizontal arm 104 is connected by means of a connecting rod 105 with the pedal 106 which is pivotally mounted on shaft 76. This pedal is provided at its rear end with an upwardly extending arm 107 which overlaps a corresponding arm 108, which is nonrotatably secured to one end of shaft 109 that is rotatably mounted in bearing 110 at the upper end of bracket 73a. A pedal 111 is nonrotatably attached to the other end of shaft 109 and extends downwardly at an inclined angle in the manner shown in Fig. 9. It is evident that when pedal 111 is moved downwardly, it will impart to pedal 106 a corresponding movement in the opposite direction and this will move connecting rod 105 upwardly, thereby rotating the crank arm 104 clockwise when viewed as in Fig. 1 and this, in turn, will move the connecting rod 101 towards the right and bring friction pinion 41 into engagement with the friction surface of disk 40. Since disk 40 is of small diameter compared to disk 44, shaft 99 will be rotated at a comparatively low speed when motion is transmitted through disk 40 and pedal 111 can therefore be termed the "low speed pedal". When pedal 106 is moved downwardly, its movement is transmitted through connecting rods 105 and 101 in such a way that the other pinion 41 on shaft 99 engages the friction surface 44 and this imparts a high speed rotation of shaft 99 in a direction opposite to that at which it was rotating when power was transmitted through the friction disk 40. It will be seen from the above description that pedals 106 and 111 control the speed of rotation and also the direction of rotation of the reel in the housing S. The speed in either of these directions is constant, but the speed in one direction is greater than that in the other direction. The object of this is to be able to use the reel in this housing for rewinding films at a high speed while transferring it from one reel to another and the low speed is for the purpose of reversing the direction of movement of a film that is being inspected while it is being rewound onto a reel positioned in housing R. This operation will be more fully described hereinafter.

On the drawings a motor 112 has been shown whose function is to operate the film splicing mechanism 9, but as this mechanism is illustrated and described in applicant's copending application above identified, it will not be described in detail here, but reference will be made to a few of the parts so as to facilitate identification when comparison is made with the device shown in the copending application. A housing 113 contains a speed reduction gear and power is applied to this from the motor by means of a belt transmission 114. Shaft 115 operates one member of a friction clutch 116 whose operation is controlled by a handle 117. In the previous parts of this description reference has been made to an interlock between the pedals controlling the two friction gears. It is evident that unless some means is provided to prevent such an occurrence, the operator might accidentally press pedal 77 and simultaneously therewith either pedal 106 or 111 with the result that the operation of the machine would be seriously interfered with. To prevent such an accidental occurrence, an interlock is provided which comprises a lever 118 that is mounted for free rotation on shaft 103 in the manner shown in Fig. 8. The upper end of the lever extends a considerable distance above shaft 103 and is connected to the table 8 by means of a tension spring 119. This spring being normally under considerable tension, tends to hold the lever 118 in a vertical position, but permits it to be quite readily moved to one side or the other.

Referring now more particularly to Fig. 10, it will be seen that the lower part of lever 118 is provided on the right hand side thereof with a laterally extending portion 120 whose corner is inclined as shown at 121 and which has a downwardly extending finger 122. Pedal 77 is positioned above the upper edge of the lateral portion 120 and normally directly above the inner edge of the inclined surface 121. It is evident that when pedal 77 is moved downwardly, it will engage the inclined surface 121 and move the lever towards the left, thereby positioning the lever 106 in the notch 123. It will be noted that the corners of the upper and lower end walls of notch 123, which have been designated by numeral 124, are outwardly and downwardly inclined so that if pedal 106 is moved downwardly before pedal 77 is moved, lever 118 will be moved towards the right so as to bring the upper edge of the lateral portion 120 underneath pedal 77, thereby assuring that this cannot be moved into operative position until pedal 106 is returned to the position shown in Fig. 10.

Referring now more particularly to Fig. 9, it will be seen that the arm 108 which is nonrotatably connected with shaft 109 to which pedal 111 is also nonrotatably connected, will move counterclockwise whenever pedal 111 is moved downwardly. This will move pedal 106 upwardly and the upper edge of the last mentioned pedal will engage the upper inclined surface 124 and move the latch member 120 underneath pedal 77 and it will thus be seen that whenever either pedal 106 or 111 is moved downwardly an interlock is effected that will prevent pedal 77 from being operated. It will also be noted that pedals 106 and 111 are interconnected by the arms 107 and 108 so that when one moves downwardly the other will move upwardly. This makes it possible to reciprocate the connecting rod 101 in either direction by exerting downward pressure on the proper pedal. A crank arm or lever 125 is nonrotatably connected with the front end of shaft 103 and has its upper end connected with the table top 8 by means of a spring 126. Spring 126 is always under tension and serves to hold the parts in such a position that pulleys 41 will be held out of contact with the friction surfaces of disks 40 and 44. In Figs. 8 and 10 a set screw 127 has been shown and the crank arm 102 has been shown as having a slot 128. Screw 127 serves to move the pivot pin 129 upwardly and downwardly in the slot so as to adjust the effective length of this crank arm for the purpose of adjusting the movement of frame 97.

The current for operating the motor is controlled by switch 130 and the wires leading from this switch to the motor are enclosed in flexible conduits 131.

Formed integral with the door 10 of the reel housing R is a film chamber 132 as shown in Figs. 1 and 13. This chamber is formed by a circular wall 133 that projects outwardly from the door and this chamber is provided with a hinge door 134 which is normally held in closed position by spring 135 which is associated with the hinge 136. The wall of the chamber has an opening 137, shown in Fig. 14, and a projecting shelf 138. A cover member 139 secured to the housing by suitable means such as a rivet 140 forms an opening through which the film 141 can pass. The front end of the cover is notched as indicated at 142 so as to facilitate the grasping of the film by the operator whenever he wants a length of film from this container. A U-shaped member 143 is pivoted at 144 for movement in the arc shown by dotted lines in Fig. 14. The transverse member 145 forms a shear blade that cooperates with the outer end of the shelf 138 for the purpose of severing the film. A spring 146 serves to hold the shear member in the position shown in Fig. 14. The handle 147 is secured to the shear member for convenience in moving the same. During operation a length of leader film is placed in the housing and its end extended through the opening in the manner shown in Fig. 14 and whenever a leader is required, the operator merely pulls the desired length from the housing and shears the same by moving the member 143 which accomplishes this function.

Operation

Let us now assume that we have a machine constructed in the manner above described and illustrated on the drawings and that we want to rewind, and at the same time, inspect a film that has passed through a projecting machine. The operation will be as follows: The reel is placed in the housing S and the end extended through the opening 16 and brought across the space between the two reel housings and inserted into the housing R and attached to a reel positioned therein. The doors 10 are now closed after which the switch 130 is closed, thereby starting the operation of motor 28. This rotates shaft 36 and the three friction disks 37, 40 and 44. The operator now exerts pressure on the foot plate 94 of pedal 77 moving the same downwardly, thereby rotating shaft 69 in a clockwise direction when viewed as in Fig. 6. The position of roller 65 at the beginning of the operation is indicated by dotted lines in Fig. 4. The movement of crank arm 68 moves the crosshead 56 towards the right and when roller 65 engages the inclined surface 93, it will be turned about its pivot until the end 62 engages the stop 63. This motion which effects the toggle action, moves the pinion 82 against the friction surface of disk 37 and the parts are so adjusted that the pinion 82 first contacts with the friction disk at substantially the center thereof so that the pinion does not rotate until the crosshead has been moved a slightly greater distance towards the right or towards the rear of the machine. As soon as the contact between the pinion and the friction disk takes place some distance from the center, the pinion will start rotating, but at a slow speed and this motion will be transmitted to the reel in housing R by pulley 55 and belt 15. If the speed is to be increased, the operator merely presses pedal 77 downwardly a further distance, thereby rotating shaft 69 through a further angle which moves the crosshead 56 and pinion 82 towards the right, as shown in Fig. 6, thereby increasing the speed. Whenever the reel is to be stopped pressure on the pedal is released, allowing spring 80 to move the pedal upwardly and this moves the crosshead 56 towards the left, thereby allowing the pawl 60 to assume the position shown in Fig. 3, which releases the pressure between the pinion and the friction disk, thereby allowing the reel to stop and to be reversed if necessary. If the pressure is now reexerted on pedal 77, the pinion will be moved into operative engagement with the disk at substantially the same place where it was when the pressure was released. If, however, pressure is entirely removed, from the pedal 77, the spring 80 will function to move the parts slightly beyond the position shown in Fig. 3 until the roller 65 reaches the position shown by dotted lines in Fig. 4. Whenever pedal 77 is moved downwardly, it moves the interlock lever towards the left in Fig. 10, as previously explained, thereby positioning the pedal 106 in the notch 123 and this forms an interlock whose function will appear presently.

During the time the film is wound on to the reel in housing R the supply reel in housing S can rotate freely, as it is retarded only by the friction of the parts. If a broken portion is found in the film and this passes into the reel R before the film is stopped, the operator merely removes all pressure from pedal 77 and exerts pressure on pedal 111, thereby moving one of the friction pinions 41 into engagement with the friction disk 40 whereupon the reel in housing S will be rotated in a reverse direction and at a slow speed and this rotation is continued until the torn or broken part is brought into the proper position to be spliced by the mechanism indicated by reference numeral 9. During this reverse operation, pedal 106 is moved upwardly and this moves the latching lever 118 towards the right in Fig. 10 which renders the pedal 77 inoperative, thereby obviating all danger of energizing the two friction transmissions at the same time.

If a film is to be rewound at high speed without inspection, the supply reel may be placed in housing R and the rewind reel in housing S and the film proper connected to the empty reel. Pressure can then be exerted on pedal 106, thereby moving the outer pinion 41 into engagement with the friction surface of disk 44, whereupon the reel in housing S will be rotated at a high speed but in a direction reverse to that in which it was rotated through the action of disk 40. When pedal 106 is moved downwardly that moves the interlock lever 118 towards the right and renders pedal 77 inoperative.

It will be seen from the above description that the invention that forms the subject of this application is of a simple and substantial construction and that the speed of the rewind reel can be controlled within wide limits by the movement of the pedal 77 so as to obtain the maximum efficiency from the operation. The slow return movement effected by the mechanism controlled by pedal 111 makes it practical to return the film in case the broken portion passes into the rewound casing.

In the device illustrated and described, certain specific mechanisms have been used to illustrate the several elements, but it is possible that the same function can be obtained by specifically different, but equivalent mechanisms and the specific construction shown and described should therefore be considered as illustrative of means and not in a limiting sense.

Having described the invention what is claimed as new is:

1. In a film rewind machine having a table, a reel mounted thereon for rotation about its axis, a motor carried by the table, a shaft carried by the table, and means for driving the shaft from the motor, means for transmitting power from the shaft to the reel comprising a friction disk having a friction surface on one side, a frame pivotally connected with the table for rocking movement about an axis parallel with the friction surface of the disk and below the center of the disk, a shaft carried by the free end of the frame, a friction pinion slidably, but nonrotatably attached to the last named shaft, a pedal pivotally connected with the table, resilient means for holding the pedal in elevated position, means comprising a slidable crosshead for effecting a movement of the pinion along its shaft, means comprising a shaft, connected for limited rotary movement with the crosshead, a crank arm connected therewith, means connecting the pedal to the crank arm for first effecting a limited rotation of the last named shaft and then moving the crosshead whenever the pedal is turned about its pivot, and means for moving the pinion into engagement with the friction surface whenever it is moved outwardly from the center of the disk and for moving it away from the friction surface when it is moved in the opposite direction, said last named means comprising a pawl attached to the last named shaft and a cooperating guide extending parallel with the friction surface with which the free end of the pawl cooperates.

2. In a film rewind machine having a table, reels mounted thereon for rotation about spaced axes, a motor carried by the table, a shaft carried by the table, and means for driving the shaft from the motor, means for transmitting motion from the shaft to one of the reels comprising, a friction disk nonrotatably attached to the shaft, said disk having a friction surface on one side, a frame pivotally connected with the table adjacent the disk for rocking movement about an axis parallel with the friction surface of the disk and positioned below the center of the disk, a countershaft carried by the free end of the frame, a friction pinion slidably but nonrotatably attached to the last named shaft, a pedal pivotally connected with the table, resilient means for holding the pedal in raised position, means operated by the pivotal movement of the pedal for moving the pinion along its shaft, an abutment member, spaced from the friction surface of the disk and extending parallel thereto, a pawl operatively connected with the pivoted frame and with the pinion for simultaneous movement with the latter when it moves radially relative to the disk, the pawl being movable about a pivot substantially parallel with the plane of the friction surface of the disk and substantially perpendicular to the pinion shaft, the outer end of the pawl engaging the abutment, stops for limiting the rotation of the pawl about its pivot, and resilient means for urging the abutment towards the friction surface.

3. In a film rewind machine having a table, a film reel supported thereby, a motor supported by the table, a shaft positioned beneath the table top and mounted for rotation, means for rotating the shaft by the motor, means for transmitting motion from the shaft to the reel, comprising in combination two friction disks attached to the shaft, in spaced relation, a movable frame positioned between the disks, a shaft rotatably attached to the frame, two friction pinions nonrotatably connected with the last named shaft, one pinion engaging one disk when the frame moves in one direction and the other engaging the other disk on movement of the frame in the opposite direction, both pinions being positioned on the same side of the center of rotation of the disks, means for transmitting motion from the last named shaft to the reel, two pedals pivotally connected with the table, means for transmitting motion from each pedal to the movable frame whereby downward movement of either pedal moves the frame, the pedals moving the frame in opposite directions, so as to effect an operative engagement of one of the pinions with the corresponding friction disk, means operated by the downward movement of either pedal for moving the other pedal upwardly, and resilient means for normally holding the movable frame in a neutral position between the friction disks.

4. In a film rewind machine having a table, a film reel supported thereby, a motor supported by the table, a shaft positioned beneath the table top and mounted for rotation, and means for rotating the shaft by the motor, two friction disks attached to one end of the shaft, in spaced relation, a movable frame positioned between the disks, a counter shaft rotatably attached to the frame, two friction pinions nonrotatably connected with the countershaft, one pinion engaging one disk when the frame moves in one direction and the other pinion engaging the other disk when the frame moves in the other direction, both pinions being positioned on the same side of the center of rotation of the disks, means for transmitting motion from the countershaft to the reel, two pedals pivotally connected with the table, means for transmitting motion from each pedal to the movable frame whereby downward movement of either pedal moves the frame so as to effect an operative engagement between one pinion and the corresponding friction disk, means operated by the downward movement of either pedal for moving the other pedal upwardly, resilient means for normally holding the movable frame in a neutral position between the friction disks, a second film reel supported by the table, a third friction disk carried by the first mentioned shaft, a frame positioned adjacent, and movable relative to the third friction disk, a countershaft rotatably connected with the last named frame, a friction pinion connected with the last mentioned shaft for engagement with the third friction disk, a third pedal pivoted to the table, means for moving said last mentioned frame towards and away from the third friction disk when the third pedal is rocked about its pivot, means operated by the movement of the third pedal for latching the other two pedals in inoperative position when the said third pedal is moved in a direction to produce operative engagement between the pinion carried by the associated frame and the third friction disk, means for transmitting motion from the last named countershaft to the second film reel, and means for latching the third pedal in inoperative position when either of the other pedals is first moved to operative position.

5. A power transmitting means for independently rotating either of two spaced reels comprising, in combination, a support, a bearing carried thereby, a drive shaft rotatably mounted in the bearing, two spaced friction disks carried by the drive shaft, a frame movably connected with the support adjacent each friction disk, a countershaft rotatably mounted in each frame, means for transmitting motion from each countershaft to a reel, a friction pinion splined to each countershaft, one of the pinions being slidable along its countershaft, two pedals pivotally attached to the support, resilient means for holding the pedals in elevated position, means connecting the pedals each to a separate frame whereby a downward movement of the pedals will move the corresponding frame and friction pinion into engagement with the corresponding friction disk, and means operated by the downward movement of either pedal for latching the other against downward movement whereby only one reel can be rotated at one time.

6. A power transmitting means for independently rotating either of two spaced reels, comprising in combination, a support, a bearing carried thereby, a drive shaft rotatably mounted in the bearing, two spaced friction disks carried by the drive shaft, a frame movably connected with the support adjacent each friction disk, a countershaft rotatably mounted in each frame, means for transmitting motion from each countershaft to a reel, a friction pinion splined to each countershaft, one of the pinions being slidable along its countershaft, two pedals pivotally attached to the support, resilient means for holding the pedals in elevated position, means connecting the pedals each to a separate frame whereby a downward movement of the pedals will move the corresponding frame and friction pinion into engagement with the corresponding friction disk, the means connecting one of the pedals with its movable frame serving also to move the pinion that is slidable along its countershaft, outwardly along the friction disk to change the speed ratio, and means operated by the downward movement of either pedal to latch the other pedal against downward movement whereby only one friction gear can be operated at one time.

7. A power transmission means for selectively turning either of two independently rotatable elements mounted on a support, comprising a motor driven shaft mounted on the support, three friction disks nonrotatably attached to the shaft, two of said disks forming a pair, the other disk being positioned at one end of the shaft, a movable frame positioned between the two disks forming the pair, a second movable frame positioned adjacent the other friction disk, a countershaft rotatably mounted on each frame, a friction pinion nonrotatably connected with each countershaft, means for transmitting motion from each countershaft to a separate one of the rotatable elements, the pinion adjacent the single disk being slidable on its countershaft, means for moving the frame between the pair of disks in either direction whereby the friction pinion carried thereby can be moved into engagement with either disk of the pair and rotated in either direction while the drive shaft rotates in one direction, said means comprising two pedals, the downward movement of each pedal moving the frame in a different direction, means comprising a third pedal for moving the frame adjacent the friction disk at the end of the shaft towards the disk to bring the friction pinion into engagement therewith, and means operated by the downward movement of either one of the three pedals for latching the other two in inoperative position.

8. In a machine for selectively rotating either one of two rotatable elements, comprising a support on which the elements are carried, a drive shaft rotatably carried by the support, two friction gear elements splined to the shaft, each of which has a friction surface, a frame movably attached to the support adjacent each friction gear element, a countershaft rotatably connected with each frame, means for transmitting motion from each countershaft to a separate one of the rotatable elements, a friction pinion nonrotatably attached to each countershaft, one pinion being slidable along its countershaft, means for moving the pinions into operative engagement with the corresponding friction gear element comprising a pair of pedals pivoted to the support, means operated by one of the pedals for moving the slidable pinion outwardly along the friction surface of its corresponding friction element, and means operated by the downward movement of either one of the pedals for latching the other pedal against downward movement whereby only one friction gear can be operated at one time.

JACOB M. GOLDBERG.